(12) United States Patent
Oberoi et al.

(10) Patent No.: US 12,242,816 B2
(45) Date of Patent: Mar. 4, 2025

(54) TASK-ACTION PREDICTION ENGINE FOR A TASK MANAGEMENT SYSTEM

(71) Applicant: MICROSOFT TECHNOLOGY LICENSING, LLC, Redmond, WA (US)

(72) Inventors: Raunak Oberoi, Seattle, WA (US); Shashank Madiraju, Hyderabad (IN); Ajay Kumar, Hyderabad (IN); Neha Singh, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 236 days.

(21) Appl. No.: 17/711,864

(22) Filed: Apr. 1, 2022

(65) Prior Publication Data
US 2023/0004727 A1    Jan. 5, 2023

(30) Foreign Application Priority Data
Jun. 30, 2021 (IN) .............................. 202141029376

(51) Int. Cl.
G06F 40/40 (2020.01)
G06Q 10/0631 (2023.01)
H04L 51/046 (2022.01)

(52) U.S. Cl.
CPC ....... *G06F 40/40* (2020.01); *G06Q 10/06311* (2013.01); *H04L 51/046* (2013.01)

(58) Field of Classification Search
None
See application file for complete search history.

(56) References Cited

U.S. PATENT DOCUMENTS

2020/0344194 A1\* 10/2020 Hosseinisianaki ..... G06N 3/084
2020/0379735 A1   12/2020 Sutton et al.
2021/0304733 A1\*  9/2021 Jalaluddin ............. G06F 40/284

OTHER PUBLICATIONS

"International Search Report and Written Opinion Issued in PCT Application No. PCT/US22/031679", Mailed Date: Sep. 27, 2022, 11 Pages.

\* cited by examiner

*Primary Examiner* — Quynh H Nguyen
(74) *Attorney, Agent, or Firm* — Shook, Hardy & Bacon L.L.P.

(57) ABSTRACT

Methods, systems, and computer storage media for providing predicted task-actions for tasks from a plurality of task applications associated with a task management system. In operation, a task associated with a task application is accessed at a task-action prediction engine. An intent of the task is determined. The intent of the task is determined based on task features and an intent prediction machine learning model that is trained to predict intents associated with natural language text. Based on the intent of the task, a predicted task-action is selected based on a task-action computation model that is associated with predefined task-actions and predefined intent-task-categories. The predicted task-action can be communicated to a task management client that causes display of the predicted task-action in combination with a predicted task-action interface element associated with executing the predicted task-action. The predicted task-action can be displayed with supplemental task-action information for executing the predicted task-action.

20 Claims, 16 Drawing Sheets

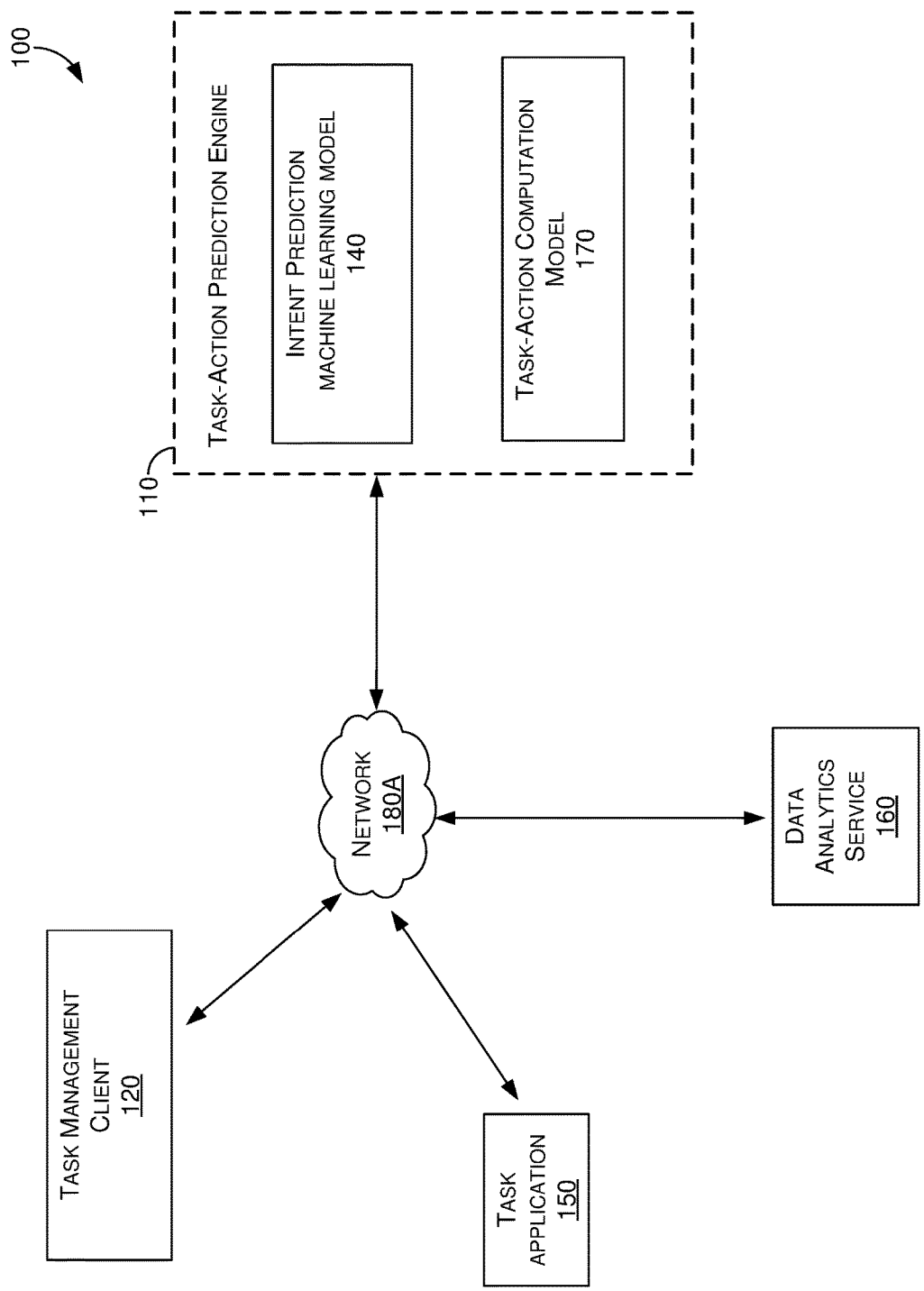

FIG. 4B

TASK-ACTION PREDICTION ENGINE FOR A TASK MANAGEMENT SYSTEM

CROSS-REFERENCE TO RELATED APPLICATIONS

This application claims priority to Indian Patent Application No.: 202141029376, filed Jun. 30, 2021, the entire contents of which is hereby incorporated by reference in its entirety.

BACKGROUND

Users rely on computing resources such as applications and services to perform various computing tasks. Productivity tools systems (e.g., a cloud-based suite of productivity application and services) include different types of software—from word processing software to email and personal information software—that provide functionality to support performing computing tasks. For example, a cloud-based email application may include a to-do list for managing tasks associated with emails. Task management systems (e.g., task management applications and task management services) in productivity tools systems support creating, tracking, and reporting on user tasks. For example, computing resources of a standalone task management client can logically track and manage tasks based on information received from a user.

Conventionally, task management systems are limited in their capacity to provide integrated and intelligent management of tasks to efficiently execute intended task goals. Some conventional task management systems—such as those in task applications—were developed to meet specific user needs, where the user needs are associated only with particular computing contexts (e.g., email tasks, to-do-list task, or digital assistant tasks). As a result, these task management systems are not integrated with other applications, services, or computing resources, which leads to inefficient computing operations in that tasks are managed independently. In addition, some task management systems are designed to merely communicate listings of tasks without additional functionality to facilitate performing the tasks. As such, a more robust task management system—with an alternative basis for performing task management operations—can improve computing operations and interfaces in task management systems.

SUMMARY

Various aspects of the technology described herein are generally directed to systems, methods, and computer storage media, for among other things, providing predicted task-actions for tasks from a plurality of task applications associated with a task management system. A predicted task-action is a projected action associated with accomplishing the task. The predicted task-action (also known as a suggested action, a quick action, or a smart action) of a task may be computed based on task features of the task and communicated to a user to proactively enable executing the projected action. For example, in response to identifying a task, "Talk to John Smith," from a task application (e.g., a to-do list of an email application), a projected task-action may be determined to be, "Send email to John Smith," based on determining an intent (e.g., communication) of the task from a set of predefined intent-task-categories (e.g., communication, document, learning, find time, and travel and expenses). The projected task-action (i.e., "Send email" in this example) is one of a set of predefined task-actions that correspond to an intent-task-category from the set of predefined intent-task-categories.

Conventionally, task management systems do not provide computing logic to provide integrated and intelligent management of tasks to efficiently execute intended task goals. A technical solution—to the limitations of conventional task management system operations—provides predicted task-actions via a task-action prediction engine of a task management system. In operation, the predicted task-action engine accesses a task that is associated with a task application. For example, a task may include a flagged email in an email application, explicit tasks that are added to a to-do list of an application, or implicit tasks that are derived from task application data. The predicted task-action engine determines an intent of the task using task features of the task and an intent prediction machine learning model. The intent prediction machine learning model is trained to predict intents based on natural language text corresponding to task features and a set of predefined intent-task-categories. Based on the intent of the task, a predicted task-action is selected for the task.

In addition, in some embodiments, the task management client (e.g., a task management application) initially requests task data that triggers the task-action prediction engine to access the task from the task application. The predicted task-action engine further operates to communicate with a data analytics service to retrieve data analytics service data that can be used to generate or communicate supplemental task-action data. The supplemental task-action data can—in some instances—be identified based on task features of the task and the intent determined for the task. The predicted task-action is selected based on a task-action computation model that defines a set of predefined task-actions that correspond to the set of predefined intent-task-categories. The predicted task-action is communicated to a task management client.

Moreover, in some embodiments, the task management client operates with the task-action prediction engine to provide the predicted task-action through a predicted task-action interface of the task management client. The predicted-task action interface includes predicted task-action interface elements (e.g., interface controls to initialize a chat, email, or other activity using a video-telephony system, email application, or other application) that support performing the predicted task-action. For example, if the predicted task-action is to "Send an email," the predicated task-action interface provides interface elements (e.g., an envelope icon, "Send email" hyperlink) to support sending the email. In some examples, the interface elements may include additional elements for reviewing details corresponding to supplemental task-action data. The task management client receives the predicted task-action, in some cases along with supplemental task-action data (e.g., documents, images, contact information, or resource locators) that are relevant for performing the predicted task-action.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein:

FIG. 1A is a block diagram of an exemplary task management system for providing predicted task-actions using a task-action prediction engine of the integrated management system, in accordance with aspects of the technology described herein;

FIGS. 4A, 4B and 4C are exemplary predicted task-action interfaces for providing predicted task-actions using a task-action prediction engine in a task management system, in accordance with aspects of the technology described herein;

DETAILED DESCRIPTION

Figure 1B:
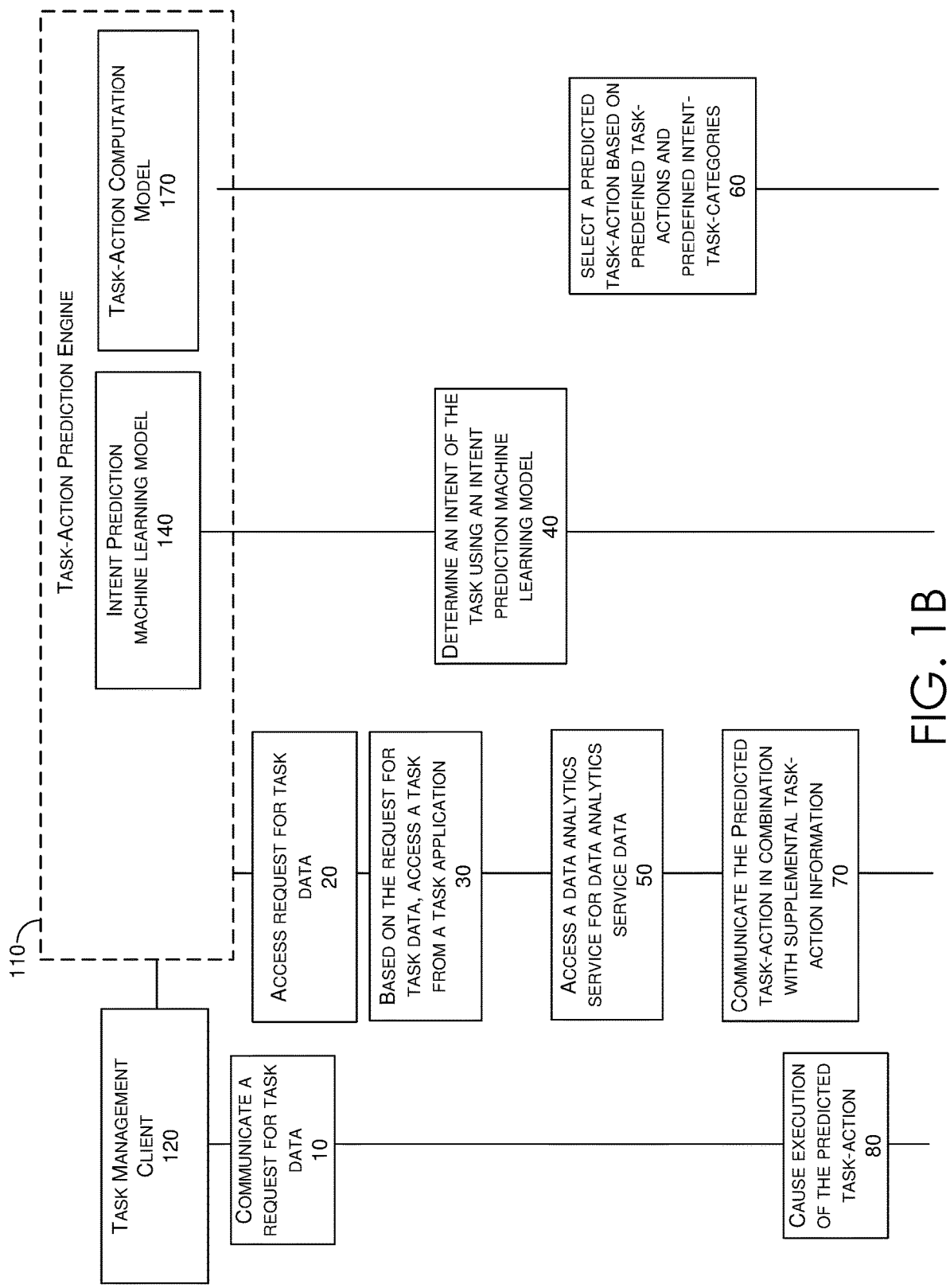
FIG. 1B is a block diagram of an exemplary schematic for providing predicted task-actions using a task-action prediction engine in a task management system, in accordance with aspects of the technology described herein.

Task management systems (e.g., task management applications and task management services) in productivity tools systems support creating, tracking, and reporting on user tasks. For example, computing resources of a standalone task management client can logically track and manage tasks associated with day-to-day interactions of users. Conventionally, task management systems are limited in their capacity to provide integrated and intelligent management of tasks to efficiently execute intended task goals. Some conventional task management systems operate based on a limited data set of task details (e.g., user-provided data) when performing task management. For example, a conventional task management system provides an interface to receive manually-entered tasks and task details into a task application—in many ways, the interface is exclusively an electronic to-do list without much more. Such task management systems rely on the limited data set of task details in providing task management functionality.

Moreover, conventional task management systems do not facilitate identifying or performing an underlying action associated with a task. Currently, a task management system (e.g., a to-do list) of an application (e.g., email application) simply provides a listing of tasks. The burden is on the user to identify an appropriate action to complete the task, and the application must perform additional processing of user input to perform the identified action. For example, if a task indicates that a first user should send an email to a second user—without indicating the second user's email address—the first user has to trigger operations that cause additional inefficient computations by the application to determine the email address of the second user and then initialize an email drafting interface. As such, a more robust task management system—with an alternative basis for performing task management operations—can improve computing operations and interfaces in task management systems.

Embodiments of the present disclosure are directed to simple and efficient methods, systems, and computer storage media for providing predicted task-actions using a task-action prediction engine of a task management system. A predicted task-action is a projected action associated with accomplishing the task. The predicted task-action (also known as a suggested action, a quick action, or a smart action) may be computed based on task features of a task and communicated to a user to proactively enable executing the projected action. The task may be associated with one or more of a plurality of task applications associated with a task management system. The task management system may be integrated with the plurality of task applications via a data analytics service. The task applications provide task application data—and the data analytic s service provides data analytics service data to provide additional task management functionality as described herein. In this way, embodiments of the present disclosure include a technical solution to the limitations of conventional task management system operations and interfaces.

Aspects of the disclosure can be described by way of examples and with reference to FIGS. 1A-1E. With reference to FIG. 1A, FIG. 1A is an example task management system 100 for providing predicted task-actions in accordance with embodiments of the present disclosure. The task management system 100 provides components, instructions, operations, and interfaces for generating, processing, communicating, and presenting predicted task-actions using the following: a task-action prediction engine 110, a task management client 120, intent prediction machine learning model 140, task application 150, data analytics service 160, task-action computation model 170, and network 180A.

At a high level, the task management system 100 provides one or more predicted task-actions for a task based on first predicting an intent of the task, and then selecting likely task-actions (i.e., predicted task-actions) that are associated with the tasks. The likely task-actions are caused to be displayed via a task management client 120 that is configured to trigger execution of the task via a predicted task-action interface, e.g., in response to a user selection of the task-action. Initially, a task is retrieved via the task-action prediction engine; the task may refer to an implicit or explicit work item or assignment. The task may be assigned to a user. The task may be associated with a task application or any other type of application that includes information that can be used to identify the task. A task may include one or more subdivisions of the task that is referred to as a step(s). A task can be associated with an action—and specifically a predicted task-action—that is, a projected action, suggested action, or smart action identified for accomplishing the task.

The task management system 100 can be developed as a platform module that is communicatively coupled to different application or service endpoints (e.g., endpoints associated with productivity applications and services of a cloud-based implementation) for accessing tasks. For example, a to-do application having a first task can include an endpoint associated with task-action prediction engine such that the task is accessed for predicting a first predicted task-action for the first task. The task management system 100 can specifically include communicatively coupled task applications to support managing tasks from the task applications. The task applications may be part of the same computing ecosystem as the task management system or may be part of a different ecosystem.

By way of example, with reference to FIG. 1B, the task management client 120 may be a to-do client application that supports tracking tasks from several different sources of task data of the tasks. The task management client 120 can specifically provide session credentials of a user, where the session credentials are used to access user-specific task data from data Application Programming Interfaces (APIs) that support retrieving data analytics service data. The to-do client application calls a service (e.g., a service of the task-action prediction engine 110). The service provides a framework for communications between the to-do client application and the task-action prediction engine 110. The service fetches a task from a task application (e.g., task application 150). Task applications, such as email applications or to-do lists can identify user-entered tasks, flagged emails, or inferred tasks. The task-action prediction engine 110 includes an intent prediction machine learning model 140 that operates to analyze the task and determine an intent of the task. The task-action prediction engine 110 may further (e.g., based on a particular intent) retrieve additional information (e.g., data analytics service data) from a data analytics service 160—for processing the task. The data analytics service 160 can refer to APIs of a data and intelligence platform with a unified programmability model for accessing data associated with a cloud-based productivity tools implementation.

Figure 1C:
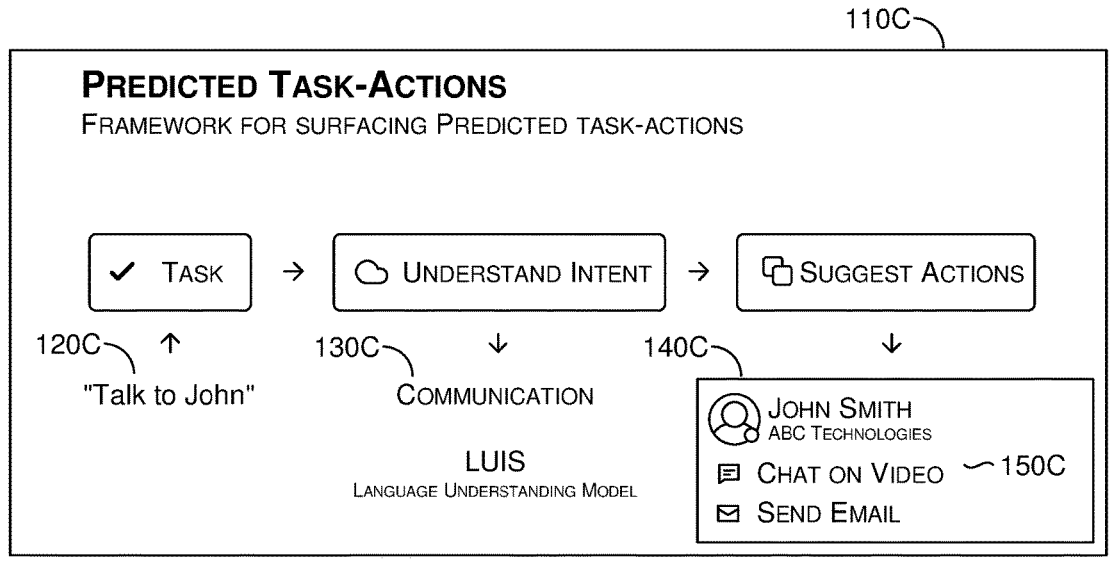
FIG. 1C is a block diagram of an exemplary schematic for providing predicted task-actions using a task-action prediction engine in a task management system, in accordance with aspects of the technology described herein.
Figure 1D:
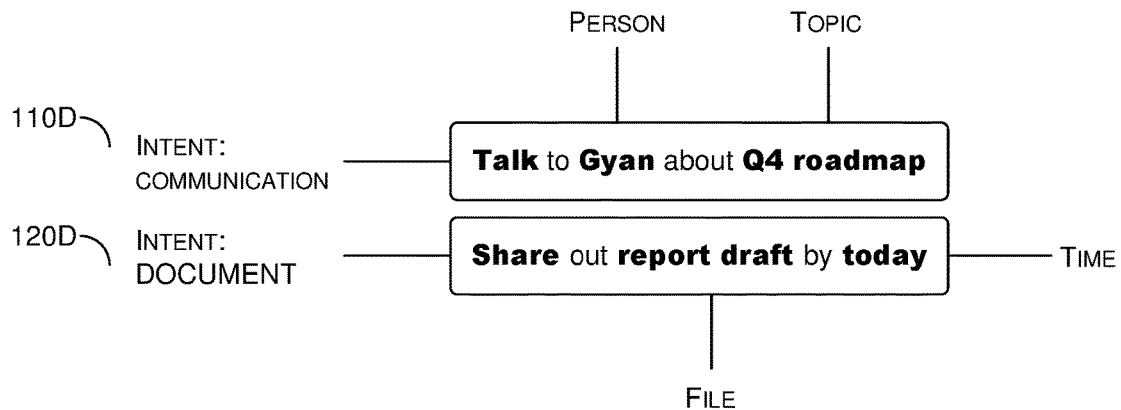
FIG. 1D is a block diagram of an exemplary schematic for providing predicted task-actions using a task-action prediction engine in a task management system, in accordance with aspects of the technology described herein.

By way of illustration, with reference to FIGS. 1C and 1D, FIG. 1C illustrates a framework for surfacing predicted task-actions on a predicted task-action interface. For example, text from an email may read "Talk to John" 120C. The text may be analyzed (e.g., via task-action prediction engine) to identify a first task. A language understanding model (e.g., LUIS 142 of FIG. 1E) of the task-action prediction engine is employed to understand an intent of the task. The intent can be identified based on task features associated with the task. As illustrated, a "communication" intent 130C is identified for the task. The intent (i.e., communication in this example) and task features are analyzed to determine a predicted task-action 140B and supplemental task-action information 150C. The predicted task-action and supplemental task-action information are generated for display. For example, in the illustrated case, a first predicted task-action is "Chat on Video" and a second predicted task-action is "Send email." Supplemental task-action data 118B can include profile information for "John Smith."

With reference to FIG. 1D, an exemplary schematic for identifying intent and supplemental task-action information is shown in FIG. 1D. Communication 110D and document 120C can correspond to intent-task-categories of a set of predefined intent-task-categories. At a high level, an intent-task-category can refer to a classification of a task that supports identifying a predicted task-action for the task, based on a set of predefined task-actions for the intent classification. Operationally, task features (i.e., programmatically defined characteristics) of a task are compared to intent-task-categories features to identify an intent-task-category associated with task. For example, task features of the text "Talk to Gyan about Q4 roadmap" may correspond to "person" and "topic" intent-task-category features—such that a prediction is made that the intent-task-category is "communication." As another example, task features of the text "Share out report draft by today" may correspond to "file" and "time" intent-task-category features—such that a prediction is made that the intent-task-category is "document." Additional details for associating task features to intent-task-category features to predict an intent-task-category as discussed below.

With continued reference to FIG. 1A, the task-action computation model 170 of the task-action prediction engine—based on the intent and optionally the additional information (i.e., data analytics service data) from the data analytics service—generates a predicted task-action. The task-action computation model 170 stores the mapping between the set of predefined intent-task-categories and corresponding sets of predefined task-actions for each predefined intent-task-category. As discussed, the task features may be used to determine intent; moreover, task features may further be based on additional information (e.g., user features, documents, user-computer interaction behavior) that is associated with data analytics service data. The task-action computation model 170 may be used—based on an intent determined from the task features—to identify one or more predicted task-actions for the task. The additional information may further be used to generate supplemental task-action data that is communicated to the task management client along with the predicted task-action to cause execution of the predicted task-action.

As shown in FIG. 1B, the task management client 120, at step 10, communicates a request for task data. At step 20, the task-action prediction engine 110 accesses the request for task data from the task management client 120. At step 30, based on the request for task data, the task-action prediction engine accesses a task (e.g., task application data) from the task application 150. At step 40, using the intent prediction machine learning model 140, the task-action prediction engine 110 determines an intent of the task. At step 50, the task-action prediction engine 110 accesses data analytics service data. At step 60, the task-action prediction engine 110 uses a task-action computation model 160 to select a predicted task-action. At step 70, the task-action prediction engine 110 communicates the predicted task-action, optionally in combination with supplemental task-action data.

Figure 1E:
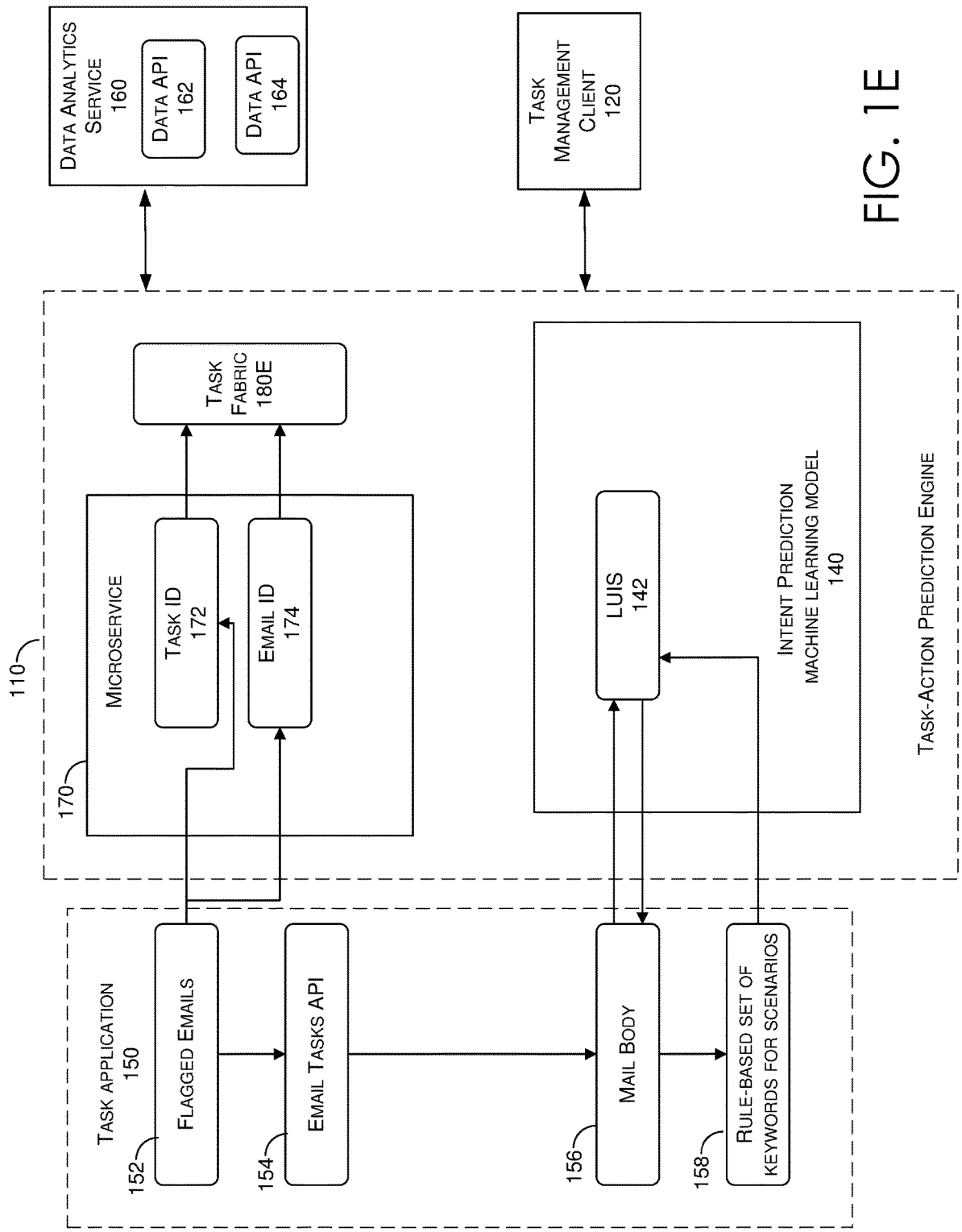
FIG. 1E is a block diagram of an exemplary schematic for providing predicted task-actions using a task-action prediction engine in a task management system, in accordance with aspects of the technology described herein.

With reference to FIG. 1E, FIG. 1E illustrates additional features of the task management system 100 for providing predicted task-actions in accordance with embodiments of the present disclosure. FIG. 1E includes task-action prediction engine 110, intent prediction machine learning model 140 with LUIS (Language Understanding Services) 142, data analytics service 160 with data API 162 and data API 164, task application 150 with flagged emails 152, email API 154, mail body 156, and rule-based set of keywords 158. The task management system 100 can support the task-action prediction engine 110 that in combination with a microservice 170 contains the logic for getting tasks, understanding an intent of the task, and suggesting actions and insights for the tasks, as discussed in more detail below.

The task-action prediction engine 110 may include the intent prediction machine learning model 140, which is configured to identify an intent for a task. The intent prediction machine learning model 140 may be based on a language understanding service framework (i.e., LUIS)—LUIS 142 may refer to a cloud-based artificial intelligence service that applies custom machine-learning intelligence to natural language text to predict overall meaning, and outputs relevant, detailed information. LUIS 142 provides access through its custom portal, APIs and SDK client libraries. At a high level, LUIS 142 processes the text (or sound converted to text) including segmentation of text into components (e.g., segmentation and tokenization). LUIS 142 further performs text cleaning (e.g., filtering out "garbage," removal of unnecessary elements). Text vectorization and feature engineering operations may be performed—and in some instances lemmatization and stemming—reducing inflections for words. Using machine learning algorithms and methods, the intent prediction machine learning model 140 is trained. Other variations and combinations of operations for providing a machine learning model are contemplated with embodiments described herein.

The intent prediction machine learning model 140 uses relevant data to classify the intent of the tasks. The task-action prediction engine supports a set of predefined intent-task-categories—each intent in the predefined set of intent-task-categories having intent features—that can be matched to task features.

In operation, using the intent prediction machine learning model 140, task features (e.g., email attributes and additional information) of a task may be classified into any of the following predefined intent-task-categories: communication (e.g., if the user task indicates the intent to contact a person); document (e.g., if the user task indicates that he wants to share/edit/create a pre-existing/new document (WORD, POWERPOINT, EXCEL)); find time (e.g., if a task specifies a deadline or idle time for the user); learning (e.g., if a task indicates learning a new work-related or home-related concept); and travel and expenses (e.g., if the task indicates travel plans or booking a trip). The intent-task categories provided here are exemplary and should not be construed as limiting. The task features may be compared to intent features extracted from historical tasks and their corresponding intents. A determination may be made that a task should have a particular intent based on a threshold similarity (e.g., an intent score) between the task features of the task and the intent features of historical intents. For example, the intent prediction machine learning model 140 may identify an intent for a task and generate an intent score that indicates a quantified likelihood that the task corresponds to a particular intent in the set of predefined intent-task-categories. The different intents can further be ranked based on a corresponding intent score of the intents. As such, the predicted task-action or an ordered listing of predicted task-actions can be provided based on the intent score(s), where the top scoring intents are selected or ranked over lower scored intents.

The microservice 170 communicates with different APIs to support retrieving additional information from external sources (e.g., data analytics service data associated with supplemental task-action data and task-action prediction data). For example, the email tasks API may return attributes such as Owner, Subject, CreatedDateTime, Importance, ReminderDateTime, CompletedDateTime, etc. associated with a task. The attributes that are received via the tasks API may be used to acquire the required data about the tasks to use LUIS 142. The microservice 180E may further communicate with a task fabric 180E that provide the computing logic or instructions for managing a task based on the task ID 172 and email ID 174.

The data analytics service 160—associated with productivity applications and services of a cloud-based provider (e.g., MICROSOFT GRAPH, SHAREPOINT, BING)—may refer to a data and intelligence platform with a unified programmability model for accessing data associated with cloud-based productivity tools. By way of example, the data analytics service 160 may include a first data API, data API 162, which may be used to retrieve the contact details of a person (e.g., display name, user principal name (alias), email, contact number). The microservice 170 can construct a URI (universal resource identifier) to a person's default mail and SIP (session initiation protocol). The APIs may also be used to retrieve a profile picture of the user.

In another example, the data analytics service 160 can include a second data API, data API 164, that may be used to retrieve the relevant files for a task related to document sharing or creating. The microservice 170 is configured to search for the required files with the help of a FileName attribute returned by the data API 164. File name is extracted from the tasks using LUIS 142 and then used to generate links of the pre-existing files the user might want to use to complete the task. The data API 164 response may include various attributes like FileName, AccessUrl, Author, DateCreated, DateModified, DateAccessed, etc. Other variations and combinations of data APIs are contemplated with embodiments of the present disclosure.

With continued reference to FIG. 1E, FIG. 1E illustrates additional features of the task management system 100 with reference to the flagged emails 152 of task application 150. In particular, flagged emails may be intelligently processed to identify explicit and implicit tasks. Flagged emails may be tracked via a task ID 172 and email ID 174. An API of the task application 150 (e.g., email tasks API 164) may be used to fetch the body of the email (e.g., mail body 156). The mail body 156 can be processed into a format that can be analyzed—via the intent prediction machine learning model 140 to identify an intent from the mail body 156. For example, the mail body 156 may be deserialized and converted into plain text, and a rule-based set of keywords for scenarios (e.g., rule-based set of keywords for scenarios 158) may be used to filter mail body 156 sentences and align them with intents (i.e., preliminary intents) from the set of predefined intent-task-categories. The intent prediction machine learning model 140 may process the filtered mail body 156 sentences and corresponding preliminary intents to identify an intent (i.e., a predicted intent) of the flagged email. It is contemplated that different types of email—and not exclusively flagged emails—may be processed using the above-described steps to identify implicit tasks and intents of corresponding tasks for providing predicted task-actions.

Figure 2A:
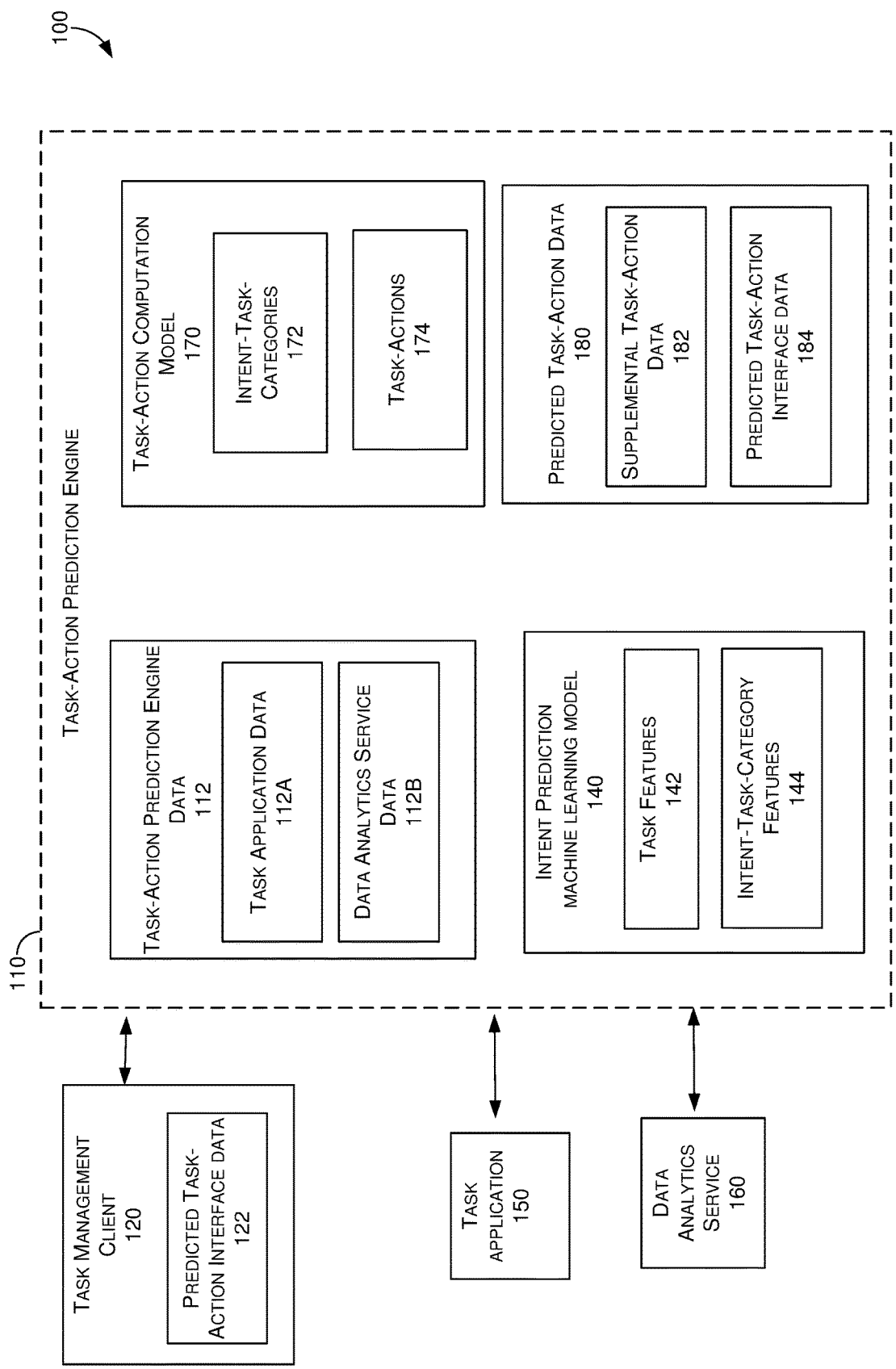
FIG. 2A is an exemplary task management system for providing predicted task-actions using a task-action prediction engine in the task management system, in accordance with aspects of the technology described herein.

Aspects of the disclosure can be described by way of examples and with reference to FIGS. 2A, 2B, 3A, 3B, 4A, 4B, and 4C. FIG. 2A is a block diagram of an exemplary computing environment, based on example environments described with reference to FIGS. 8 and 9 for use in implementing embodiments of the disclosure are shown. Generally, the exemplary computing environment includes a system suitable for providing the example task management system 100 in which methods of the present disclosure may be employed. In particular, FIG. 2A shows a high level architecture of the task management system 100 in accordance with implementations of the present disclosure. Among other engines, managers, generators, selectors, or components not shown (collectively referred to herein as "components"), the computing environment of task management system 100 includes task-action prediction engine 110—including predicted task-action data 180, supplemental task-action data 182, predicted task-action interface data 184; a task management client 120—including predicted task-action interface data 122; intent prediction machine learning model 140—including task features 142 and intent-task-category features 144; task application 150; data analytics service 160; and task-action computation model 170—including intent-task-categories 172 and task-actions 174.

In operation, the task-action prediction engine 110 is responsible for providing predicted task-actions. The task-action prediction engine receives a request for task data. The request may be received from a task management client 120 (e.g., a task management client running on a client computing device). The task management client 120 may include session credentials (e.g., user data for a user associated with the task management client) that allow the task-action prediction engine 110 to access services in the task management system 100 on behalf of the user. The task management client 120 may be a task management aggregator application that supports and integrates management of tasks from a plurality of task applications or task sources. For example, the task management client 120 may be integrated into an existing task management application (e.g., a to-do application) such that the task management application supports task management functionality based on predicted task-actions as described herein.

Based on the request for task data, the task-action prediction engine retrieves task-action prediction engine data 112 that includes task application data 112A and data analytics service data. The task-prediction engine data 112 may generally refer to data that supports determining the predicted task-action. The task application data 112A may include data retrieved from task application 150. The task application 150 may refer to any type of application (e.g., an email application) that tracks tasks, such that the task application data 112A may include information identifying tasks along with task details. The task application data 112A may include explicit task and further include implied tasks, such as tasks that are derived from text of communications or documents associated with the task application 150. For example, an email body may be analyzed to determine a task associated with the email body text. The explicit tasks and implicit tasks comprising the task application data 112B may be processed to predict an intent associated with the tasks.

The task-action prediction engine data 112 may also include data analytics service data 112B. The task-action prediction engine 110 may be associated with productivity tools software that includes data that is tracked for different users. For example, a user drafting a document using a word processor application, accessing a search engine, or accessing shared documents may have data analytics service data 112B associated with their interactions and behavior relative to the document—such as—where the document is stored and how recently the document was opened. The data analytics service data 112B may be retrieved via the data analytic s service 160 to supplement operations for providing predicted task-actions—including predicting an intent of the task. For example, user features (e.g., programmatically define characteristics of the user with regard to the task management system) can be a subset of task features that are used for determining an intent associated with a particular task. In this way, the task-action prediction engine is responsible for retrieving both task application data 112A and data analytics service data 112B that can be used for providing predicted task-actions.

The task-action prediction engine 110 includes intent prediction machine learning model 140 that uses task features and intent-task-category features to determine an intent of the task. The task features may refer to specific characteristics of a task that are determined through natural language processing of task application data 112A and data analytics service data 112B. For example, in a first scenario (e.g., communication), a communication may be identified in task application predicted task-actions (e.g., Talk to Alice, Mail Bob, Follow up with Clive). The predicted task-actions may provide the user with an option to directly start a new email to the recipient (e.g., via their default email client) or contact the person via video-telephony (or their preferred SIP client), along with the recipient's details (e.g., name, role in organization). For example, for a task of the task application for which the text reads "Talk to John Smith about demo," the intent prediction machine learning model may include intelligence for identifying the task as a communication task (or classifying the task to the intent-task-category of "communication"). The intent-task-category may specifically include intent-task-features associated with the intelligence—such as—a topic and a person that are identified in the task features. The intelligence may further include supplemental task-action data that should be retrieved based on determining that the task features correspond to a particular intent-task-category. For example, for the communication intent-task-category, a determination of a best timeslot between all parties to communicate can be made. As discussed herein, different types of intent-task-categories may include corresponding intent-task-category features and intent-task-category intelligence for comparing task features to intent-task category features to make a determination that the task belongs a particular intent-task-category.

In a second scenario (e.g., document), data analytics service data may identify a task associated with user interactions with functionality of applications and services of a cloud-based productivity tools system. For example, predicted task-actions for a document intent-task-category may be related to sharing or reviewing documents or creating new documents. Predicted task-actions may support contacting a relevant person or sharing the most relevant documents corresponding to a file or subject referenced by the task. Predicted task-actions related to sharing or reviewing documents may support fetching relevant documents and causing display of a resource locator (e.g., a link) to access the document. Predicted task-actions related to creating new documents may identify different templates, sample documents, and information on subject matter experts. For example, for a task of the task application for which the text reads "Work on demo presentation," "Send Quarterly Report to Alice" or "Have to send the foundry doc to Trilok," the intent prediction machine learning model may include intelligence to create or open a document, or also send a doc as an attachment. Intelligence to create a document may include identifying that the intent is to create document, identifying a document type to suggest templates to get started, identifying subject matter expects, and/or identifying related documents on a similar topic. Intelligence to open a document may include identifying the intent is to open a document, and identifying a relevant document based on the context of the task and working set data (e.g., most recently used documents) associated with the user.

In a third scenario (e.g., learning), a task may be identified as related to learning a subject matter related to work or any identified topic, such that supplemental task-action data may include subject matter experts (SMEs), useful content from a professional social network learning and other sources, etc. In this way, predicted task-actions may include quick links to contact SMEs or professional social network profiles. Supplemental task-action data may include identifying relevant resources on the particular topic that may be accessed via the internet or intranet. For example, for a task of the task application for which the text reads "Ramp up on data analytic service apis," "Read about microservices and REST APIS," "Learn about communication services," or "What is a microservice?," the intent prediction machine learning model may include intelligence to identify the intent to learn about a topic, identify a topic to learn, determine documents and associated links for a given topic identified with the learning intent, and identifying SMEs.

In a fourth scenario (e.g., find time), a task can be identified as related to finding time, e.g., with regard to an identified deadline approaching for a task that requires a period of focus time to accomplish the task. The supplemental task-action data may include showing free calendar slots for such activities. The predicted task-action may include showing one or more free calendar slots for approval by the user. For example, for a task of the task application for which the text reads "Complete design doc by today," "Complete some application by $31^{st}$," or "Mail Ajay details by tomorrow," the intent prediction machine learning model includes intelligence to identify free time.

In a fifth scenario (e.g., travel and expenses), a task may be identified as related to travel and expenses with regard to an trip, destination, and/or dates in text data. The supplemental task-action data may include identifying travel booking resources. The predicted task-action may include showing one or more travel booking resources or proactively executing a search to identify travel options (e.g., flight options) to book travel. For example, for a task of the task application for which the text reads "Fly to New York City on May $13^{th}$," "Get hotel for family vacation in Hawaii," or "Pay light bill for apartment," the intent prediction machine learning model includes intelligence to identify the travel and expense intent.

The task-action prediction engine 110 operates with the task-action computation model 170 to select a predicted task-action. The task-action computation model 170 is a computing model that includes a mapping of intent-task-categories to corresponding predefined task-actions. In this way, the mapping operates as an indicator of a first set of predefined task-actions that correspond to an intent-task-category. For example, the communication intent-task-category can include predicted task-actions to email a user using an email application, chat with a user via a video-telephony system, or set up a meeting—while surfacing free timeslots.

Figure 2B:
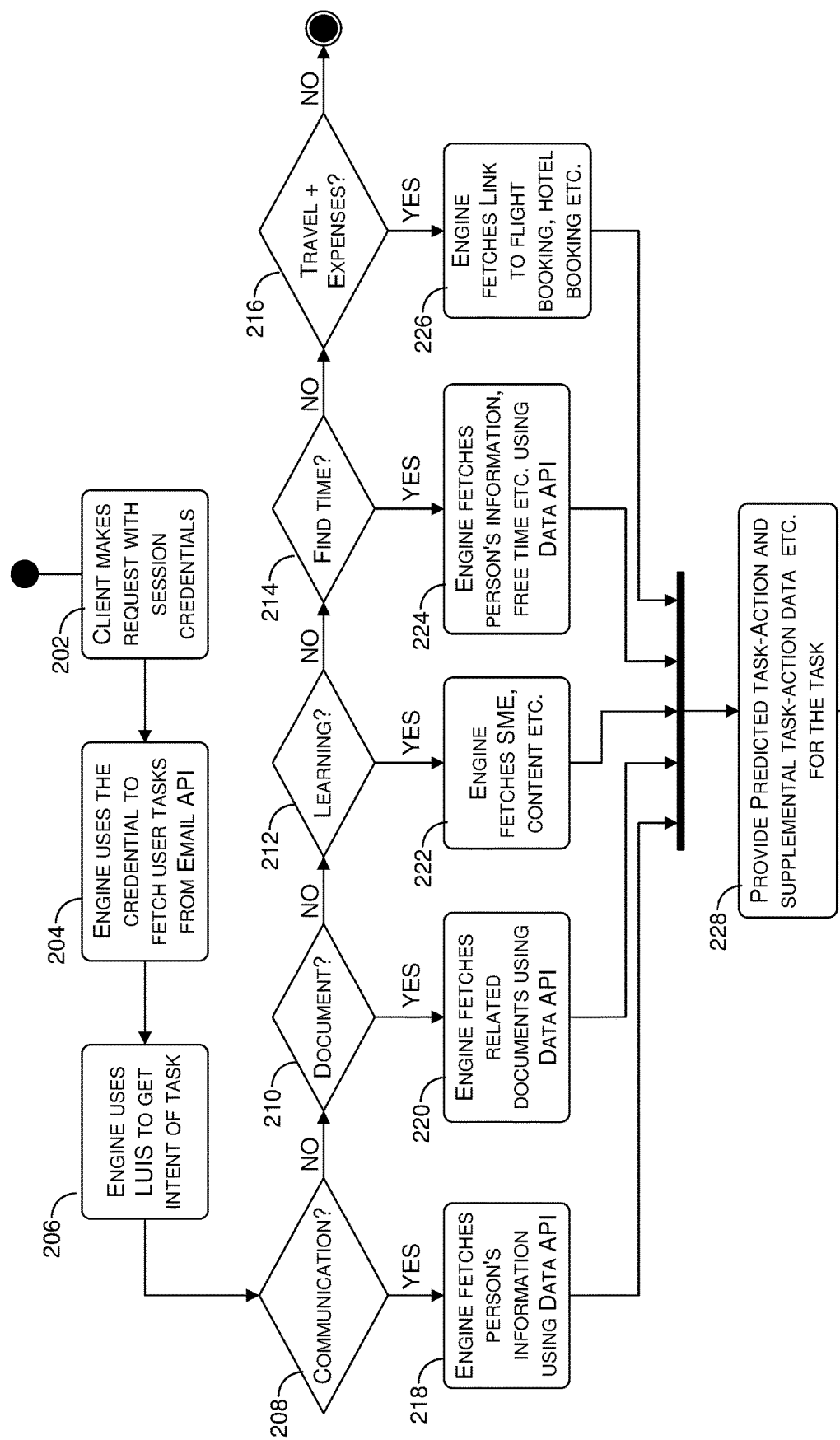
FIG. 2B is an exemplary schematic for providing predicted task-actions using a task-action prediction engine in a task management system, in accordance with aspects of the technology described herein.

With reference to FIG. 2B, FIG. 2B illustrates a schematic that identifies predefined intent-task-categories (e.g., communication 208, document 210, learning 212, find time 214, and travel and expenses 216). At step 202, a client makes a request with session credentials. At step 204, the task-action prediction engine 110 uses the session credentials to fetch user tasks from task application (e.g., email API). At step 206, the task-action prediction engine uses the intent prediction machine learning engine 140 to predict an intent of the task based on the predefined intent-task-categories.

At steps: communication 208, document 210, learning 212, find time 214, and travel and expenses 216, when a particular intent-task-category is determined, the following corresponding steps are performed: at step 218, the task-action prediction engine 110 fetches a user's information from a data API; step 220 the task-action prediction engine 110 fetches related document using a data API; step 222 the task-action prediction engine 110 fetches subject matter expert content; step 224, the task-action prediction engine 110 fetches a user information free time using a data API; and step 226 the task-action prediction engine 110 links to flight book and hotel booking. At step 228, task-action prediction engine 110 provides the predicted task-action and supplement task-action data for the task.

Figure 3A:
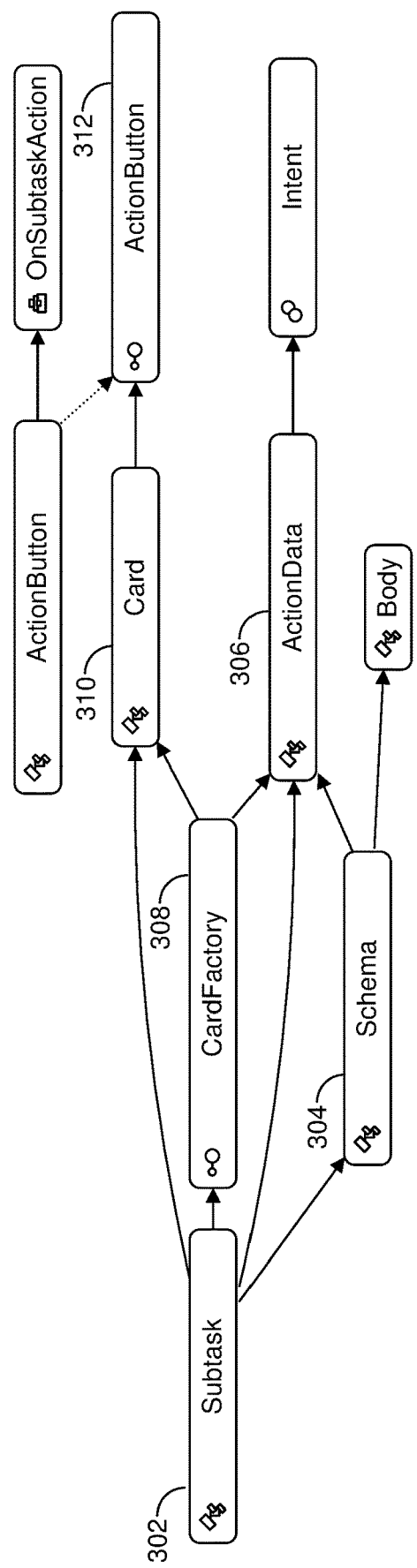
FIGS. 3A and 3B are view models for providing predicted task-actions using a task-action prediction engine in a task management system, in accordance with aspects of the technology described herein.
Figure 3B:
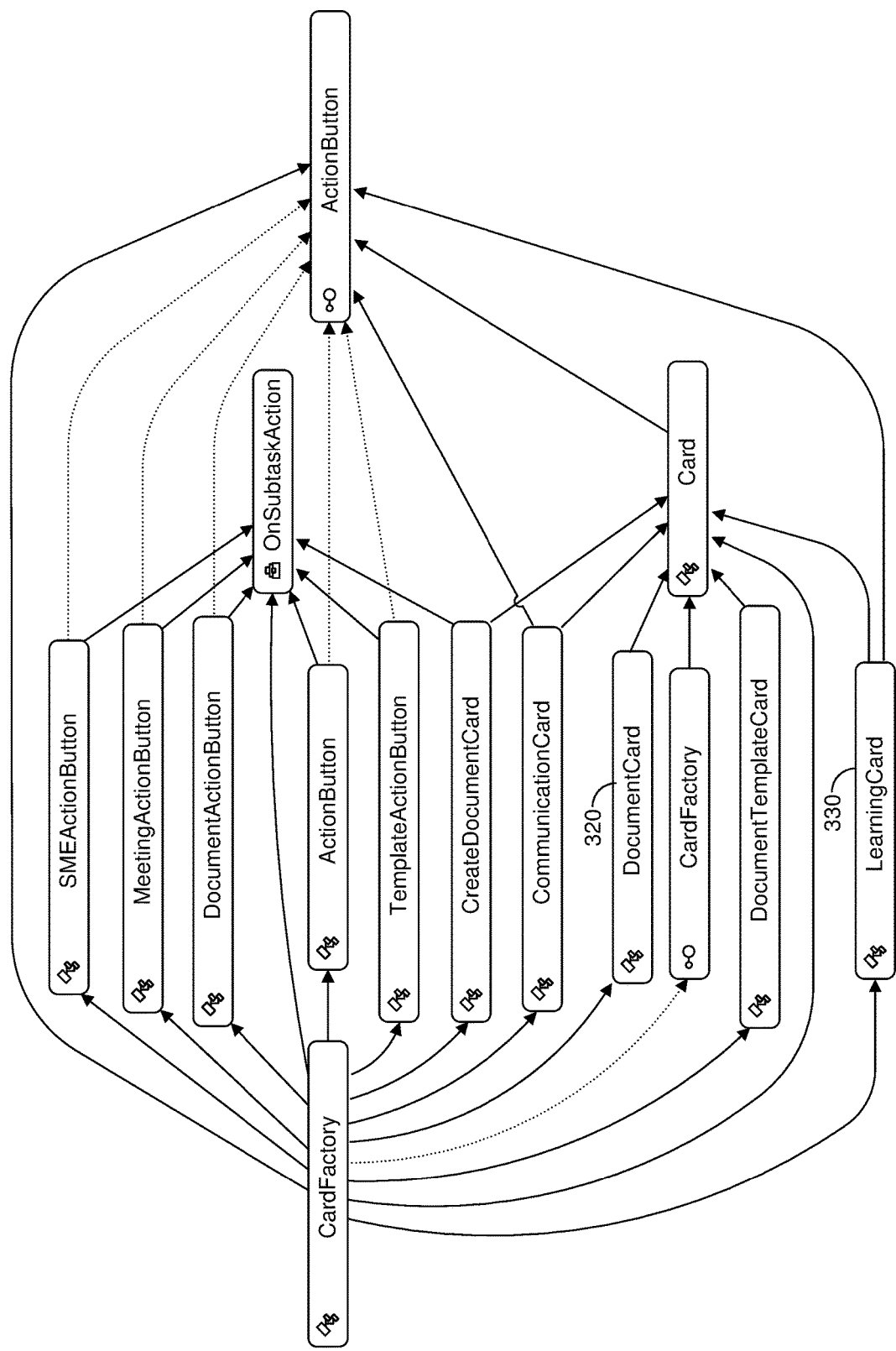

With reference to FIGS. 3A and 3B, FIGS. 3A and 3B illustrate a view model in accordance with embodiments of the present disclosure. The view model can be based on a model-view-viewmodel (MVVM) software architectural pattern that facilitates the separation of the development of the graphical user interface from development of business logic or back end logic so that the view is not dependent on any specific model. In embodiments where a task management client (e.g., a to-do application) is based on the MVVM architecture, and the views for providing the functionality described herein can be based on the same MVVM architecture.

In operation, a view can be created in an XAML (Extensible Application Markup Language) file, where the file is attached to an existing view of the task management client. For example, the task management client may identify a view (e.g., DetailsView) as such, the view for predicted title-actions (e.g., SubtaskSuggestionView) can be attached to the same view for the client application. The view can be created in an XAML file. In one implementation, a ViewModel for SubtaskSuggestionView is constructed class and associated with DetailsViewModel, and passed to the SubtaskSuggestionView. The ViewModel may contain the properties relevant to be shown on the screen—the presentation of which depends on the kind of predicted task-action that is to be taken.

As shown in FIG. 3A, by way of example, the Subtask class 302 acts as a Model class in the MVVM to control the data that the ViewModel will access. Schema 304 is the schema of the JSON (Java Script Object Notation) data arriving from the service. The Subtask class 302 fetches the data from the REST api and takes the deserialized Action-Data 306 and feeds to the ICardFactory 308. Cards are created for each action—different deriving classes for different intents—as shown in FIG. 3B (e.g., DocumentCard 320 and LearningCard 330). Each card has a list of IAction-Button 312—each button contains a Lambda function to execute on click.

Figure 4A:
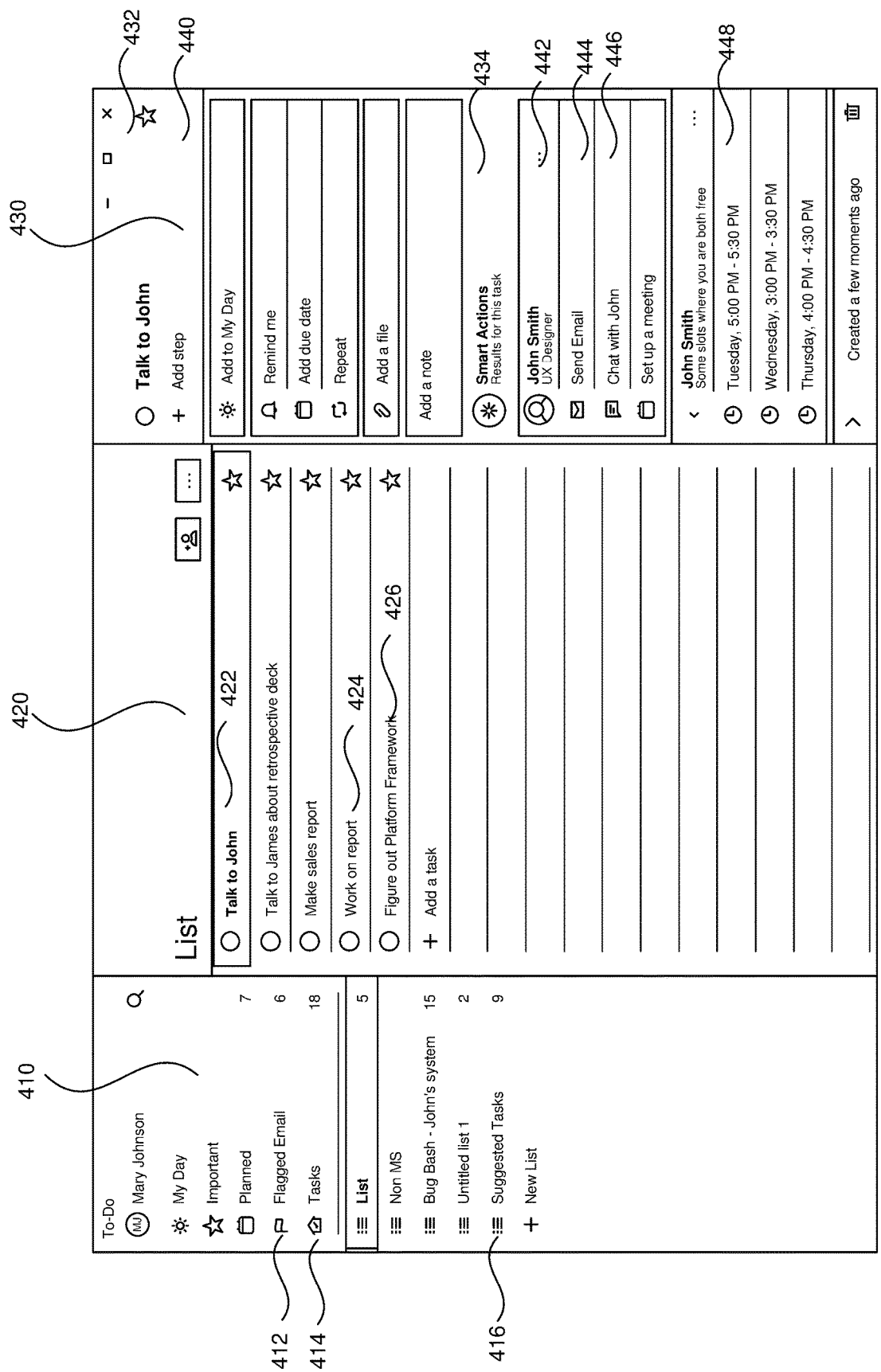
Figure 4B:
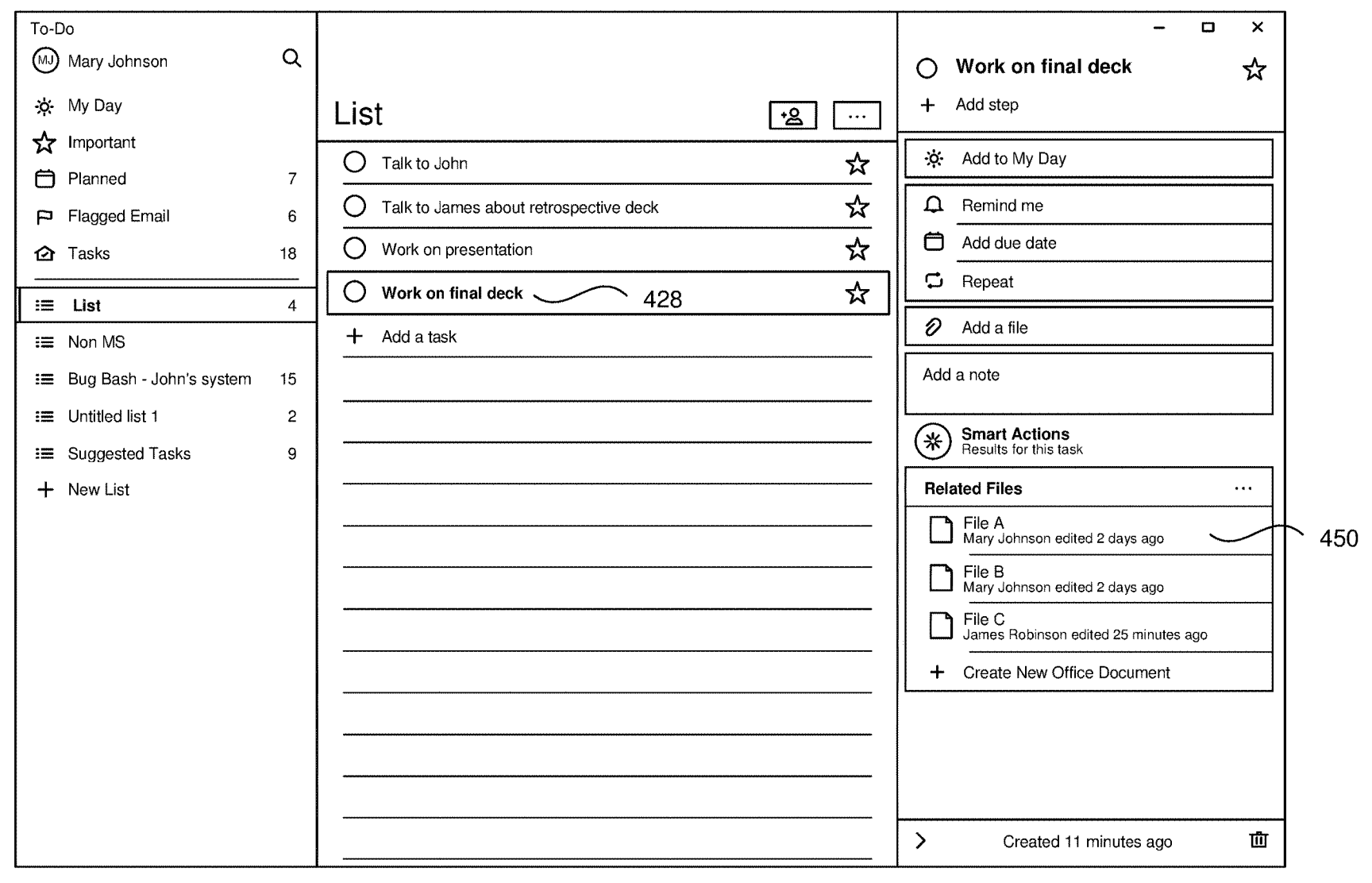

With reference to FIGS. 4A and 4B, FIGS. 4A and 4B illustrate predicted task-action interfaces with interface elements that support providing the predicted task-actions. FIGS. 4A and 4B include a first interface portion 410, a second interface portion 420, and a third interface portion 430. At a high level, the predicted task-action interfaces provide a particular manner for summarizing, presenting, and/or accessing predicted task-action data as described herein. The predicted task-action interfaces can support managing of tasks via a task management client that generates the predicted task-action interfaces.

As shown, first interface portion 410 may include selectable links to cause display of additional details associated with each corresponding link. For example, flagged emails 410, tasks 412, and suggested tasks 414 are selectable to cause display of additional details that are associated with the selectable links—and have been identified using a task-action prediction engine. Second interface portion 420 includes a list of tasks—"Talk to John" 422, "Work on report" 424, and "Figure out Platform framework" 426. For example, the tasks may be retrieved based on a task management client request for task data for a particular user, such that tasks from applications or services associated with the user are queried to retrieve tasks. The tasks are selectable to cause display of additional details that are associated with the corresponding task.

Third interface portion 430 provides additional details for a selected task from interface portion 420. Interface portion 430 can identify the task—task identification portion 432—and provide predicted task-actions for the task along with supplemental task-action—via task-action prediction data portion 434. A task may be provided on interface portion 430 as a section header in the task identification portion 432, the task as a section header is associated with several predicted task-actions that are additional interface elements provided below the task identification portion 432 in the task-action prediction data portion 434. For example, "Talk to John" 440 is a task—in this example—and it is provided along with predicted task-actions "John Smith" 442 as a contact, "Send email" 442 and "Chat with John" 446 as predicted task-actions (i.e., smart actions).

Figure 4C:
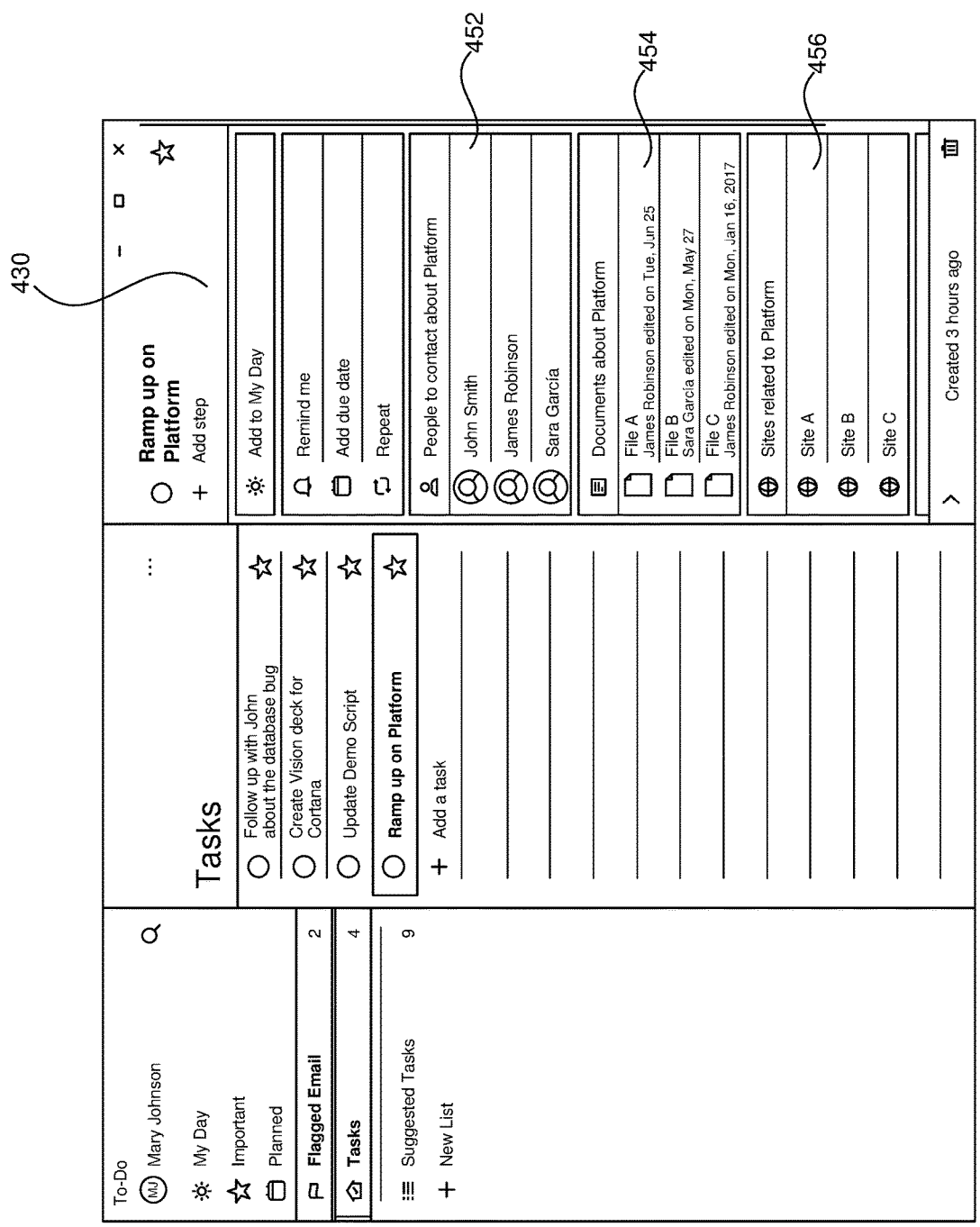

Supplemental task-action data may be provided as part of the task-action prediction data portion 434 proximate the predicted task-actions. For example, time period 448 is provided as supplemental task-action data. As shown in FIG. 4B, the "work on final deck" 428 task has been selected—as such provided with corresponding additional details—"File A" 450. As shown in FIG. 4C, "John Smith" 452, "File A" 454 and "Site A" resource location 456 are also different types of supplemental task-action data that can be provided—on interface portion 430—for a selected task.

Figure 5:
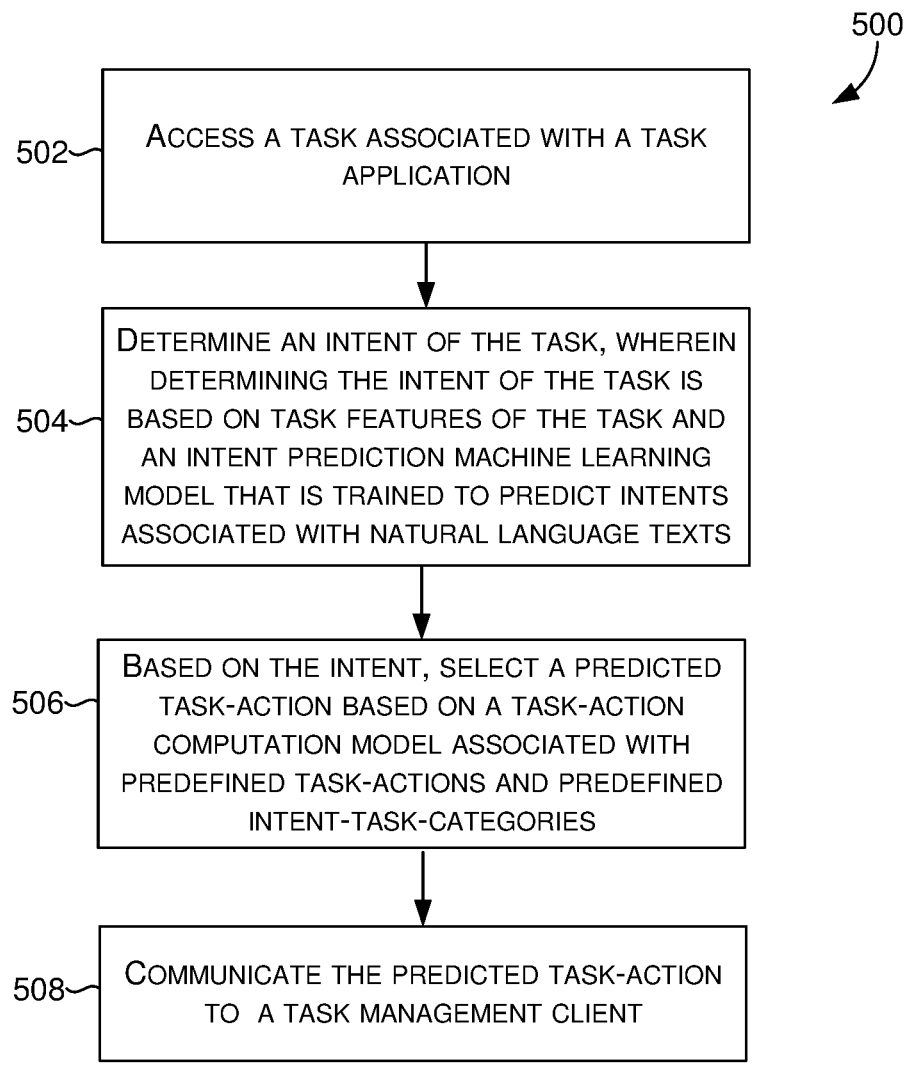
FIG. 5 provides a first exemplary method of providing predicted task-action using a task-action prediction engine in a task management system, in accordance with aspects of the technology described herein.
Figure 6:
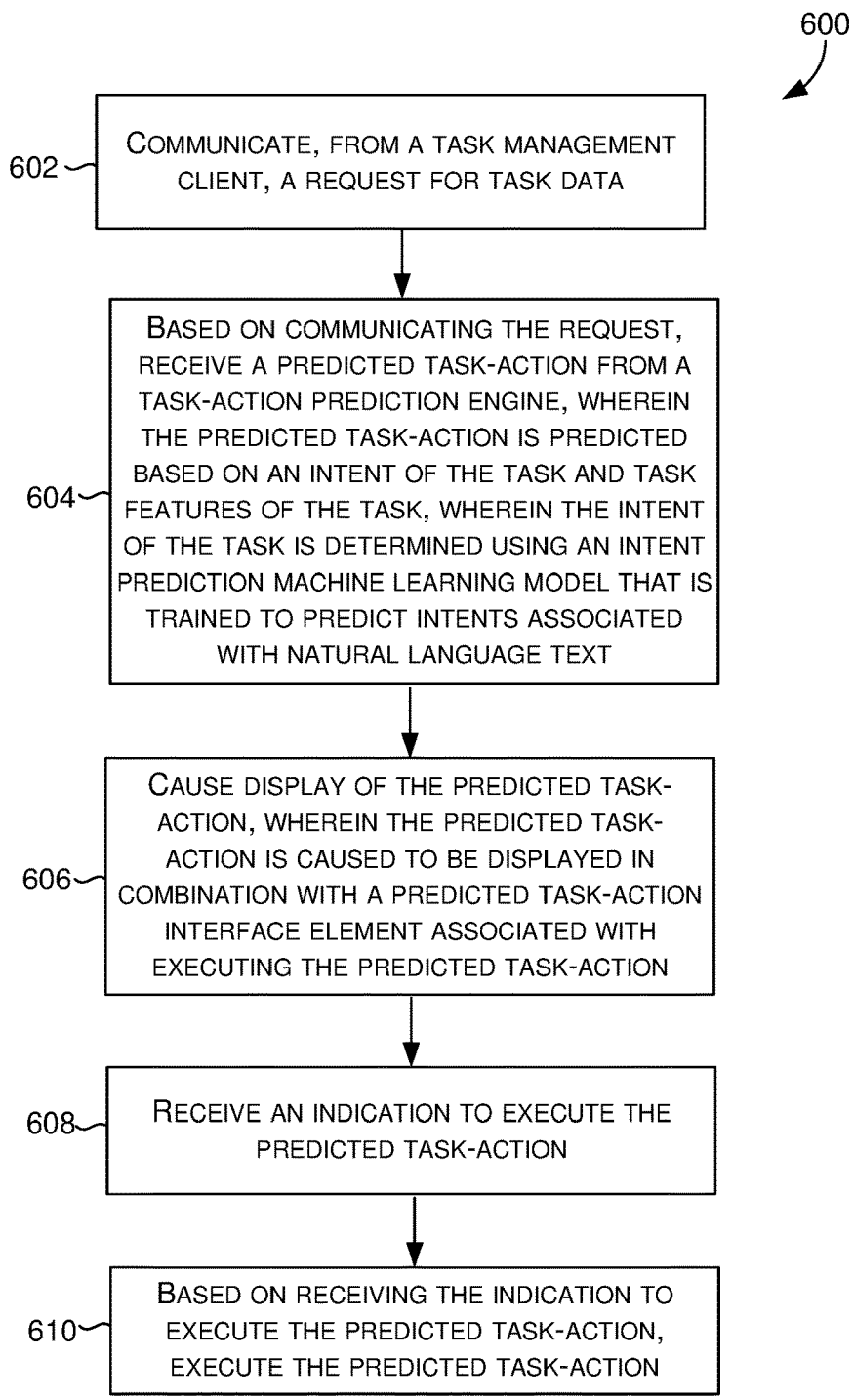
FIG. 6 provides a second exemplary method of providing predicted task-action using a task-action prediction engine in a task management system, in accordance with aspects of the technology described herein.
Figure 7:
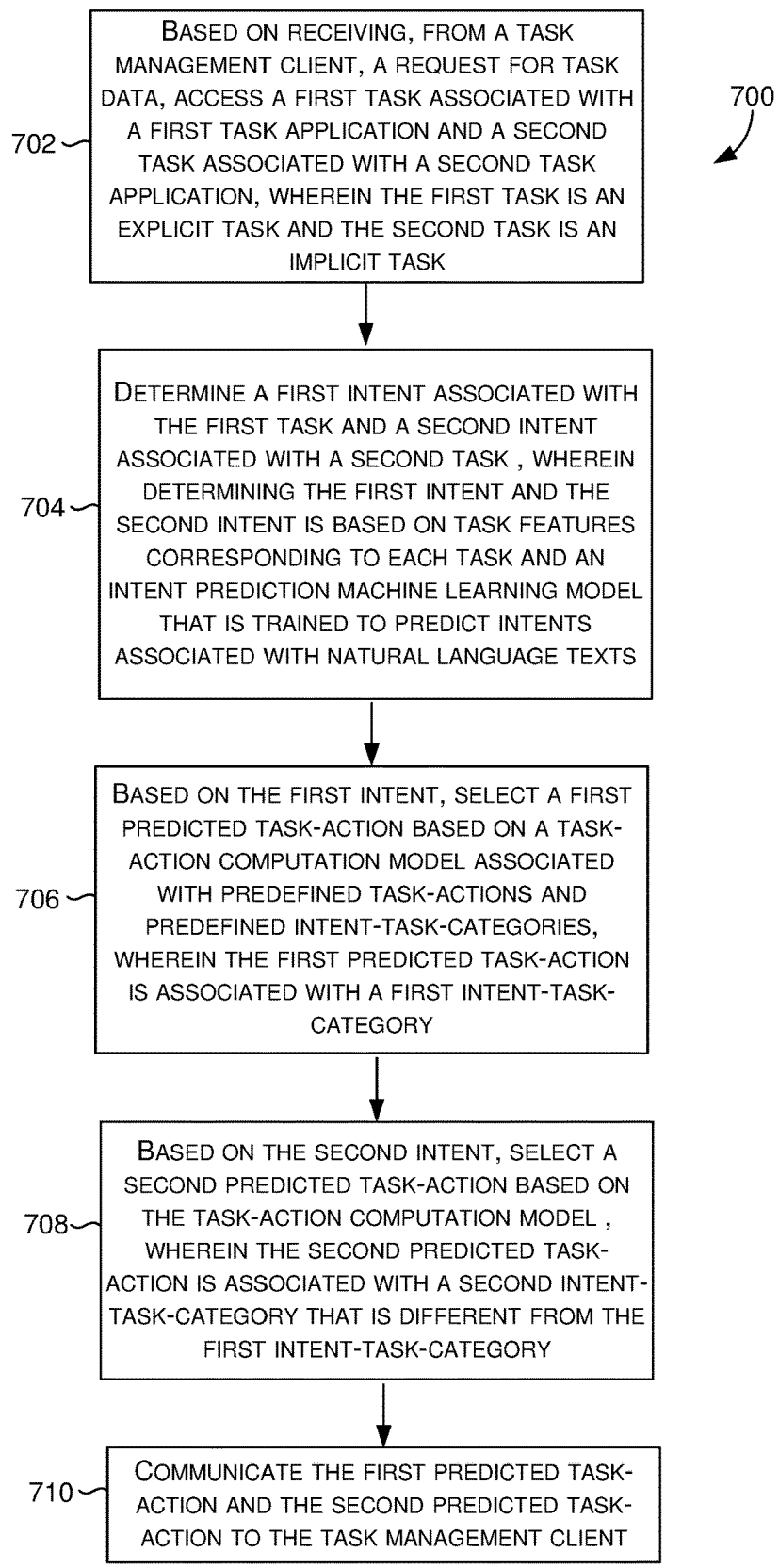
FIG. 7 provides a third exemplary method of providing predicted task-action using a task-action prediction engine in a task management system, in accordance with aspects of the technology described herein.

With reference to FIGS. 5, 6 and 7, flow diagrams are provided illustrating methods for providing predicted task-actions using a task-action prediction engine. The methods may be performed using the task management system described herein. In embodiments, one or more computer-storage media having computer-executable or computer-useable instructions embodied thereon that, when executed, by one or more processors can cause the one or more processors to perform the methods (e.g., computer-implemented method) in the multi-tenant system (e.g., a computerized system or computing system).

Turning to FIG. 5, a flow diagram is provided that illustrates a method 500 for providing predicted task-action using a task-action prediction engine. At block 502, a task-action prediction engine accesses a task associated with a task application. Accessing the task, at the task-action prediction engine, is caused by a request for task data, where the request is received from a task management client. The task management client integrates task management for a plurality of task applications and supports executing predicted task-actions via a predicted task-action interface of the task management client. At block 504, the task-action prediction engine determines an intent of the task. Determining the intent of the task is based on task features of the task and an intent prediction machine learning model that is trained to predict intents associated with natural language texts. At block 506, based on the intent, a predicted task-action is selected based on a task-action computation model associated with predefined task-actions and predefined intent-task-categories. At block 508, the predicted task-action is communicated to a task management client.

Turning to FIG. 6, a flow diagram is provided that illustrates a method 600 for providing predicted task-action using a task-action prediction engine. At block 602, a request for task data is communicated from a task management client. The request may be communicated with session credentials that allow access to task data associated with a user having the session credentials. The session credentials are used to authenticate access to user data comprising the task data that corresponds to productivity tools software of the task management system. For example, the task management client provides session credentials to the task-action prediction engine to support authenticating a user associated with the session credentials with a data analytics service to access data analytics service that is used is selecting the predicted task-action.

At block 604, based on the communicating the request, the task management client receives a predicted task-action from a task-action prediction engine. The predicted task-action is predicted based on an intent of the task and the task features of the task. The intent of the task is determined using an intent prediction machine learning model that is trained to predict intents associated with natural language text.

At block 606, the predicted task-action is caused to be displayed. The predicted task-action is caused to be displayed in combination with a predicted task-action interface element associated with executing the predicted task-action. At block 608, an indication to execute the predicted task-action is received. At block 610, based on receiving the indication to execute the predicted task-action, the predicted task action is executed.

Turning to FIG. 7, a flow diagram is provided that illustrates a method 700 for providing predicted task-action using a task-action prediction engine. At block 702, based on receiving, from the task management client, a request for task data, a first task associated with a first task application and a second task associated with a second task application are accessed via a task-action prediction engine. The first task is an explicit task and the second task is an implicit task. At block 702, a task-action prediction engine determines a first intent associated with the first task and a second intent associated with a second task. Determining the first intent and the second intent is based on task features corresponding to each task and an intent prediction machine learning model that is trained to predict intents associated with natural language texts.

At block 706, based on the first intent, select a first predicted task-action based on a task-action computation model associated with predefined task-actions and predefined intent-task-categories. The first predicted task-action is associated with a first intent-task-category. At block 708, based on the second intent, select a second predicted task-action based on the task-action computation model. The second predicted task-action is associated with a second intent-task-category that is different the first intent-task-category. At block 710, communicate the first predicted task-action and the second predicted task-action to the task management client.

Embodiments of the present disclosure have been described with reference to several inventive features (e.g., operations, systems, engines, and components) associated with a task management system having a task-action prediction engine for predicting task-actions. Inventive features described include: operations, interfaces, data structures, and arrangements of computing resources associated with providing the functionality described herein relative with reference to task-action prediction engine and user interfaces providing user interaction models. Functionality of the embodiments of the present disclosure have further been described, by way of an implementation and anecdotal examples—to demonstrate that the operations for providing predicted task actions based on an intent prediction machine learning model and a task-action computation model—are an unconventional ordered combination of operations that operate with a task-action prediction engine as a solution to a specific problem in search technology environment to improve computing operations and interfaces for user interface navigation in search systems. Overall, these improvements result in less CPU computation, smaller memory requirements, and increased flexibility in task management systems when compared to previous conventional task management system operations performed for similar functionality.

Example Distributed Computing System Environment

Figure 8:
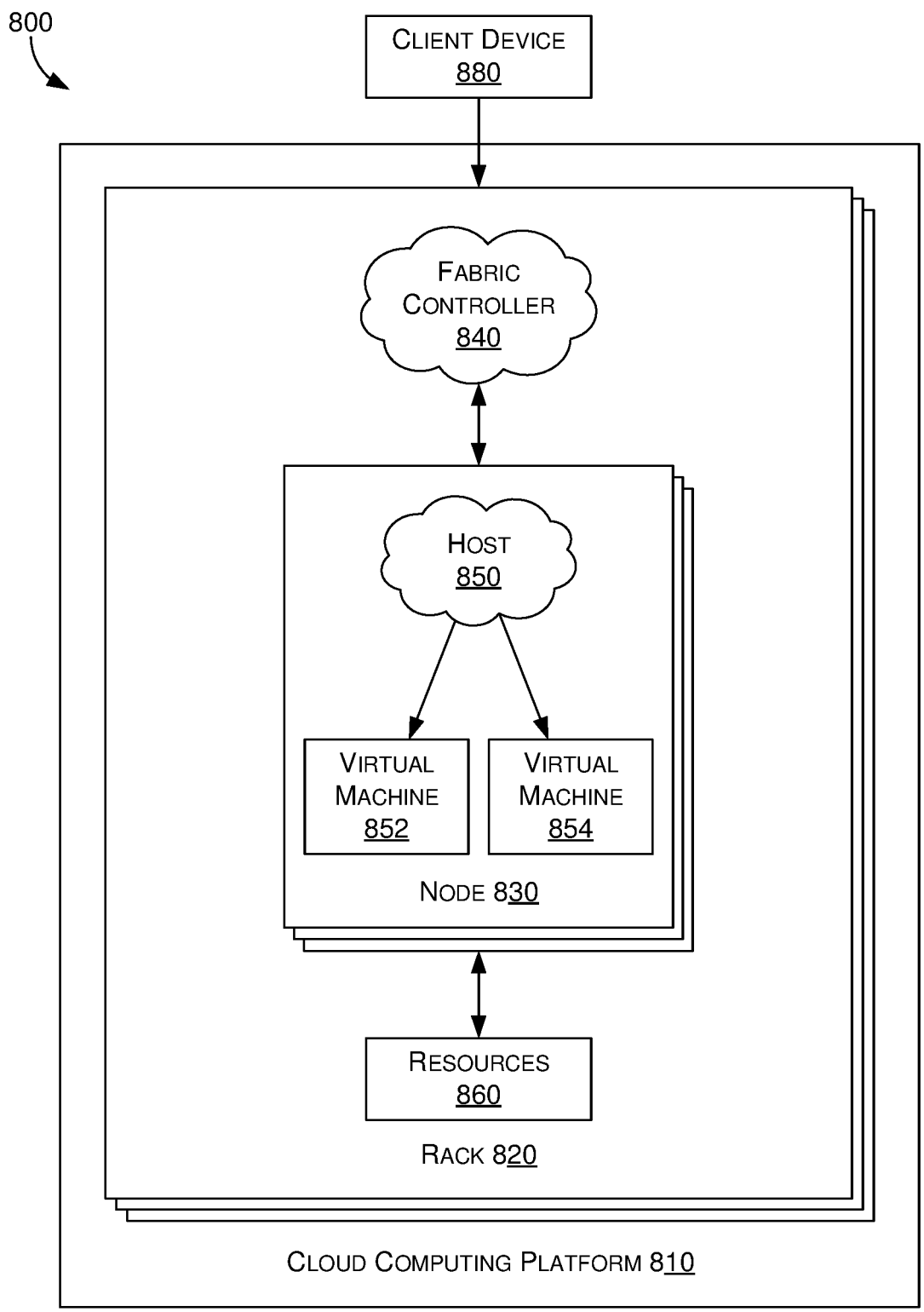
FIG. 8 provides a block diagram of an exemplary distributed computing environment suitable for use in implementing aspects of the technology described herein.

Referring now to FIG. 8, FIG. 8 illustrates an example distributed computing environment 800 in which implementations of the present disclosure may be employed. In particular, FIG. 8 shows a high level architecture of an example cloud computing platform 810 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 800 that includes cloud computing platform 810, rack 820, and node 830 (e.g., computing devices, processing units, or blades) in rack 820. The technical solution environment can be implemented with cloud computing platform 810 that runs cloud services across different data centers and geographic regions. Cloud computing platform 810 can implement fabric controller 840 component for provisioning and managing resource allocation, deployment, upgrade, and management of cloud services. Typically, cloud computing platform 810 acts to store data or run service applications in a distributed manner. Cloud computing infrastructure 810 in a data center can be configured to host and support operation of endpoints of a particular service application. Cloud computing infrastructure 810 may be a public cloud, a private cloud, or a dedicated cloud.

Node 830 can be provisioned with host 850 (e.g., operating system or runtime environment) running a defined software stack on node 830. Node 830 can also be configured to perform specialized functionality (e.g., compute nodes or storage nodes) within cloud computing platform 810. Node 830 is allocated to run one or more portions of a service application of a tenant. A tenant can refer to a customer utilizing resources of cloud computing platform 810. Service application components of cloud computing platform 810 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 830, nodes 830 may be partitioned into virtual machines (e.g., virtual machine 852 and virtual machine 854). Physical machines can also concurrently run separate service applications. The virtual machines or physical machines can be configured as individualized computing environments that are supported by resources 860 (e.g., hardware resources and software resources) in cloud computing platform 810. It is contemplated that resources can be configured for specific service applications. Further, each service application may be divided into functional portions such that each functional portion is able to run on a separate virtual machine. In cloud computing platform 810, multiple servers may be used to run service applications and perform data storage operations in a cluster. In particular, the servers may perform data operations independently but exposed as a single device referred to as a cluster. Each server in the cluster can be implemented as a node.

Client device 880 may be linked to a service application in cloud computing platform 810. Client device 880 may be any type of computing device, which may correspond to computing device 800 described with reference to FIG. 8, for example, client device 880 can be configured to issue commands to cloud computing platform 810. In embodiments, client device 880 may communicate with service applications through a virtual Internet Protocol (IP) and load balancer or other means that direct communication requests to designated endpoints in cloud computing platform 810. The components of cloud computing platform 610 may communicate with each other over a network (not shown), which may include, without limitation, one or more local area networks (LANs) and/or wide area networks (WANs).

Example Distributed Computing Environment

Figure 9:
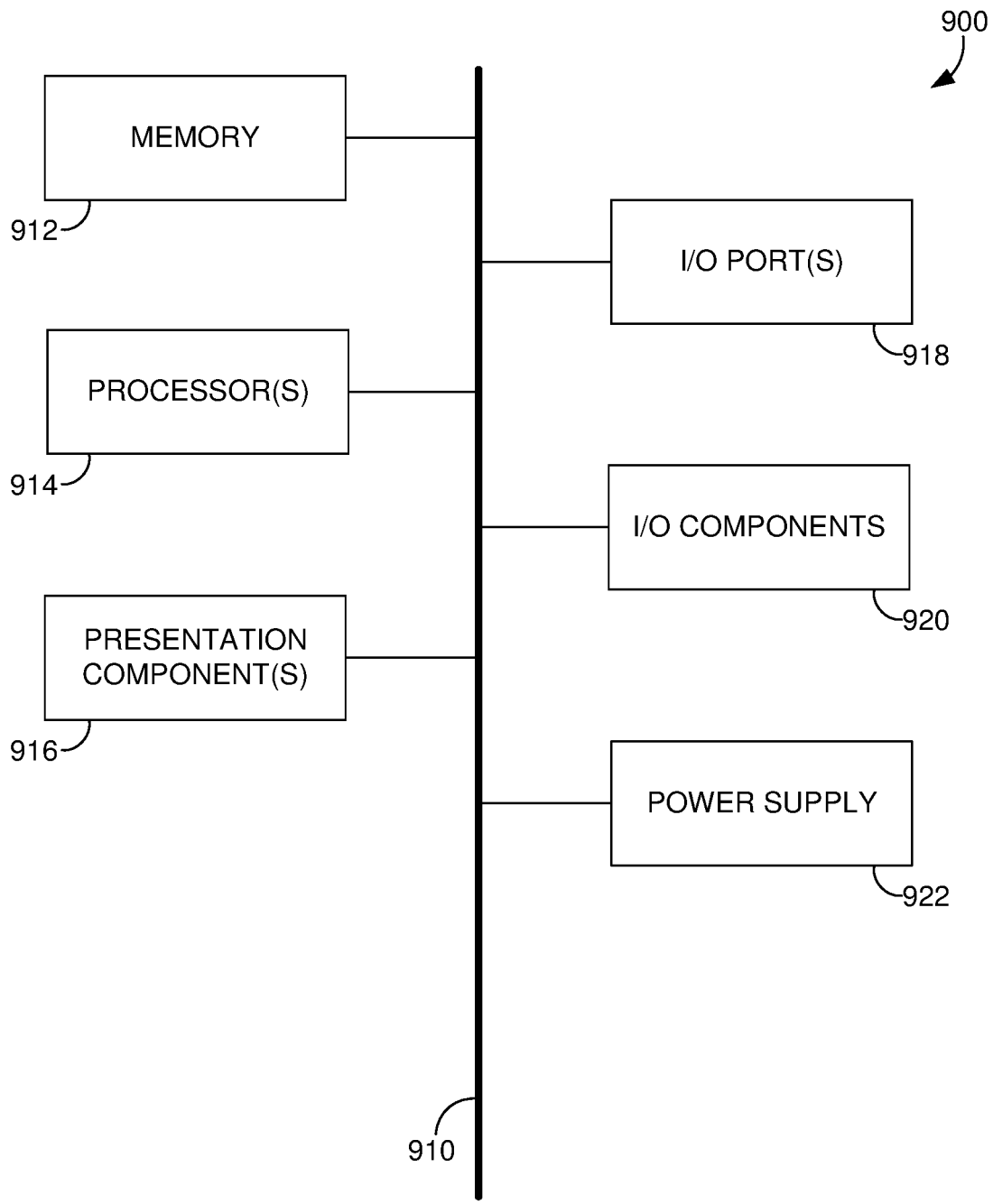
FIG. 9 is a block diagram of an exemplary computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 9 in particular, an example operating environment for implementing embodiments of the present invention is shown and designated generally as computing device 900. Computing device 900 is but one example of a suitable computing environment and is not intended to suggest any limitation as to the scope of use or functionality of the invention. Neither should computing device 900 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 9, computing device 900 includes bus 910 that directly or indirectly couples the following devices: memory 912, one or more processors 914, one or more presentation components 916, input/output ports 918, input/output components 920, and illustrative power supply 922. Bus 910 represents what may be one or more buses (such as an address bus, data bus, or combination thereof). The various blocks of FIG. 9 are shown with line s for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 9 is merely illustrative of an example computing device that can be used in connection with one or more embodiments of the present invention. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method, the method comprising:
   accessing, at a task-action prediction engine, a task associated with a task application;
   determining an intent of the task, wherein determining the intent of the task is based on task features of the task and an intent prediction machine learning model that is trained to predict intents associated with natural language text;
   based on the intent of the task and an existing mapping of predefined intent-task-categories to corresponding predefined task-actions, selecting a predicted task-action based on a task-action computation model that is associated with the predefined task-actions and the predefined intent-task-categories, wherein selecting the predicted task-action comprises:
   accessing intent-task-category features for the predefined intent-task-categories having corresponding predefined task-actions;
   comparing the task features of the task to the intent-task-category features corresponding to the predefined intent-task-categories;
   based on comparing the task features of the task to the intent-task-category features, selecting a predefined intent-task-category that corresponds to the task features; and
   using the existing mapping of predefined intent-task-categories to corresponding predefined task-actions, selecting the predicted task-action that corresponds to the predefined intent-task-category; and
   communicating the predicted task-action to a task management client to cause display of the predicted task-action in combination with the task and a predicted task-action interface element associated with executing the predicted task-action.

2. The method of claim 1, the method further comprising accessing, at the task-action engine, a second task associated with a second task application, wherein the task management client is configured to integrate task management for a plurality of application and execute predicted task-actions for the task application and the second task application via a predicted task-action interface of the task management client.

3. The method of claim 2, the method further comprising:
   receiving session credentials from the task management client;
   based on receiving session credentials, authenticating a user with a data analytics service that provides access to data analytics service data that is used in selecting the predicted task-action.

4. The method of claim 1, the method further comprising:
   based on comparing the task features of the task to the intent-task-category features, generating an intent score, wherein the intent score indicates a quantified likelihood that the task corresponds to a predefined intent-task-category.

5. The method of claim 1, the method further comprising:
   generating supplemental task-action data; and
   causing the supplemental task-action data to be displayed in association with the predicted task-action on a predicted task action interface.

6. The method of claim 1, wherein the predefined intent-task-categories comprise each of the following: communication, document, learning, find time, and travel and expenses.

7. The method of claim 1, wherein the task-action computation model is configured to:
   identify a plurality of predicted task-actions for the task, wherein each of the plurality of predicted task-actions is associated with an intent score; and
   based on an intent score of the predicted task-action and corresponding intent scores of the plurality of predicted task-actions, select the predicted task-action from the plurality task-action; and
   cause communication of the predicted task-action to the task management client.

8. One or more hardware computer-storage media having computer-executable instructions embodied thereon that, when executed by a computing system having a processor and memory, cause the processor to:
   communicate, from a task management client, a request for task data;
   based on communicating the request, receive a predicted task-action from a task-action prediction engine, wherein the predicted task-action is predicted based on an intent of the task and an existing mapping of predefined intent-task-categories to corresponding predefined task-actions, and task features of the task, wherein the intent of task is determined using an intent prediction machine learning model that is trained to predict intents associated with natural language text,
   wherein based on the intent of the task and the existing mapping of predefined intent-task-categories to corresponding predefined task-actions, the predicted task-action is selected based on a task-action computation model that is associated with the predefined task-actions and the predefined intent-task-categories, wherein selecting the predicted task-action comprises:
   accessing intent-task-category features for the predefined intent-task-categories having corresponding predefined task-actions;
   comparing the task features of the task to the intent-task-category features corresponding to the predefined intent-task-categories;
   based on comparing the task features of the task to the intent-task-category features, selecting a predefined intent-task-category that corresponds to the task features; and
   using the existing mapping of predefined intent-task-categories to corresponding predefined task-actions, selecting the predicted task-action that corresponds to the predefined intent-task-category;

causing display of the predicted task-action, wherein the predicted task-action is caused to be displayed in combination with a predicted task-action interface element associated with executing the predicted task-action;

receiving an indication to execute the predicted task-action; and causing execution of the predicted task-action.

9. The media of claim 8, wherein the task management client integrates task management for a plurality of task applications and supports executing predicted task-actions via a predicted task-action interface of the task management client.

10. The media of claim 9, wherein the task management client provides session credentials to the task-action prediction engine, wherein the session credentials are associated with authenticating a user with a data analytics service that provides access to data analytics service data that is used in selecting the predicted task-action.

11. The media of claim 10, wherein comparing the task features to the intent-task-category features is associated with corresponding intent scores that indicate a quantified likelihood that the task corresponds to a predefined intent-task-category.

12. The media of claim 8, further comprising instructions to:

generate supplemental task-action data; and cause the supplemental task-action data to be displayed in association with the predicted task-action on a predicted task action interface.

13. The media of claim 12, wherein the predefined intent-task-categories comprise each of the following: communication, document, learning, find time, and travel and expenses.

14. The media of claim 8, wherein communicating the predicted task-action over a plurality of predicted task-actions for the task is based on an intent score associated with the predefined task-action.

15. A computerized system, the system comprising:

one or more computer processors; and computer memory storing computer-useable instructions that, when used by the one or more computer processors, cause the one or more computer processors to perform operations comprising:

communicating a request for task data, wherein the request is communicated from a task management client to a task-action prediction engine;

based on receiving the request, accessing, at the task-action prediction engine, a task associated with a task application;

determining an intent of the task, wherein determining the intent of the tasks is based on task features of the task and an intent prediction machine learning model that is trained to predict intents using natural language text;

based on the intent of the task and an existing mapping of predefined intent-task-categories to corresponding predefined task-actions, selecting a predicted task-action based on a task-action computation model that is associated with the predefined task-actions and the predefined intent-task-categories, wherein selecting the predicted task-action comprises:

accessing intent-task-category features for the predefined intent-task-categories having corresponding predefined task-actions;

comparing the task features of the task to the intent-task-category features corresponding to the predefined intent-task-categories;

based on comparing the task features of the task to the intent-task-category features, selecting a predefined intent-task-category that corresponds to the task features; and using the existing mapping of predefined intent-task-categories to corresponding predefined task-actions, selecting the predicted task-action that corresponds to the predefined intent-task-category; and communicating the predicted task-action to a task management client to cause display of the predicted task-action in combination with the task and a predicted task-action interface element associated with executing the predicted task-action.

16. The system of claim 15, the operations further comprising accessing, at the task-action engine, a second task associated with a second task application, wherein the task management client is configured to integrate task management for a plurality of application and execute predicted task-actions for the task application and the second task application via a predicted task-action interface of the task management client.

17. The system of claim 16, the operations further comprising:

receiving session credentials from the task management client;

based on receiving session credentials, authenticating a user with a data analytics service that provides access to data analytics service data that is used in selecting the predicted task-action.

18. The system of claim 15, the method further comprising based on comparing the task features of the task to the intent-task-category features, generating an intent score, wherein the intent score indicates a quantified likelihood that the task corresponds to a predefined intent-task-category.

19. The system of claim 15, the operations further comprising:

generating supplemental task-action data; and causing the supplemental task-action data to be displayed in association with the predicted task-action on a predicted task action interface.

20. The system of claim 15, wherein the predefined intent-task-categories comprise each of the following: communication, document, learning, find time, and travel and expenses.

* * * * *